United States Patent [19]
Laor

[11] Patent Number: 6,076,069
[45] Date of Patent: Jun. 13, 2000

[54] METHOD OF AND SYSTEM FOR DISTRIBUTING AND REDEEMING ELECTRONIC COUPONS

[75] Inventor: Raviv Laor, New York, N.Y.

[73] Assignee: OneClip.com, Incorporated, Atlanta, Ga.

[21] Appl. No.: 09/160,748

[22] Filed: Sep. 25, 1998

[51] Int. Cl.[7] .................................................. G06F 17/60
[52] U.S. Cl. ............................ 705/14; 705/26; 705/27; 705/28; 235/379
[58] Field of Search ................... 705/14, 1, 26, 705/27, 28; 235/379

[56] References Cited

U.S. PATENT DOCUMENTS

| | | | |
|---|---|---|---|
| Re. 34,915 | 4/1995 | Nichtberger et al. | 364/401 |
| 4,674,041 | 6/1987 | Lemon et al. | 364/401 |
| 4,791,281 | 12/1988 | Johnsen et al. | 235/383 |
| 4,882,675 | 11/1989 | Nichtberger et al. | 364/401 |
| 5,117,355 | 5/1992 | McCarthy | 364/401 |
| 5,185,695 | 2/1993 | Pruchnicki | 364/401 |
| 5,193,056 | 3/1993 | Boes | 364/408 |
| 5,202,826 | 4/1993 | McCarthy | 364/405 |
| 5,237,499 | 8/1993 | Garback | 364/407 |
| 5,249,044 | 9/1993 | Von Kohorn | 358/86 |
| 5,287,268 | 2/1994 | McCarthy | 364/405 |
| 5,305,195 | 4/1994 | Murphy | 364/401 |
| 5,305,197 | 4/1994 | Axler et al. | 364/401 |
| 5,353,218 | 10/1994 | De Lapa et al. | 364/401 |
| 5,380,991 | 1/1995 | Valencia et al. | 235/383 |
| 5,420,606 | 5/1995 | Begum et al. | 345/156 |
| 5,502,636 | 3/1996 | Clarke | 364/401 |
| 5,515,098 | 5/1996 | Carles | 348/8 |
| 5,557,518 | 9/1996 | Rosen | 364/408 |
| 5,557,721 | 9/1996 | Fite et al. | 705/14 |
| 5,708,782 | 1/1998 | Larson et al. | 705/14 |
| 5,761,648 | 6/1998 | Golden et al. | 705/14 |
| 5,794,207 | 8/1998 | Walker et al. | 705/23 |
| 5,806,044 | 9/1998 | Powell | 705/14 |
| 5,855,007 | 12/1998 | Jovicic | 705/14 |
| 5,884,278 | 3/1999 | Powell | 705/14 |
| 5,903,874 | 5/1999 | Leonard et al. | 705/14 |
| 5,905,246 | 5/1999 | Fajkowski | 235/375 |
| 5,909,673 | 6/1999 | Gregory | 705/15 |
| 5,970,469 | 10/1999 | Scroggie et al. | 705/14 |

Primary Examiner—Eric W. Stamber
Assistant Examiner—Romain Jeanty
Attorney, Agent, or Firm—McDermott Will & Emery

[57] ABSTRACT

The invention consists of a method and system for enabling and enhancing electronic commerce over a communications channel.

The system includes a communication channel coupled to at least two terminals having the ability to send, and receive information. Where one terminal is deemed to be the client A, and the other terminal is deemed the server B. Upon receiving a request for information from the client A, the server B transfers the requested information. In addition to the requested information, the server B adds certain additional information in the form of a coupon C (that can be enciphered) that allows the client A to be recognized by other servers B' not necessarily related to the server B, issuing the original information C. Any server(s) B' that subsequently recognizes client A as the client A makes requests for information to the new server(s) B' would only have the ability to recognize portions of the information C related to it. When client A makes certain electronic requests from server B', server B' will simultaneously make a request to a database on server D that will authenticate the information C that transpired between client A and server B'. Upon authentication and verification by server D, server B' will allow client A to proceed with any transactions and/or any request for information subject to other criteria of server B'.

14 Claims, 5 Drawing Sheets

METHOD OF AND SYSTEM FOR DISTRIBUTING AND REDEEMING ELECTRONIC COUPONS

REFERENCE TO MICROFICHE APPENDIX

Not Applicable

STATEMENT REGARDING FEDERALLY SPONSORED RESEARCH

Not Applicable

CROSS-REFERENCE TO RELATED APPLICATIONS

Not Applicable

BACKGROUND OF THE INVENTION

This invention relates to a method of and system for distributing and redeeming electronic coupons or "tokens" in a computer network environment and more specifically to a method and system for distributing, in advance of a request for information for which the "token" has relevance which may be redeemed.

With the rapid growth of computer networking and requests for information from one computer to the next e.g. the Internet, it has become common practice for a provider of information (a "Server") to provide each specific requester of information (a "Client"), with an electronic "token" (commonly referred to as a "Cookie") for the purpose of "recognizing" the client and/or providing some pre-determined and pre-programmed level of customization at the discretion of the information provider.

Thus, in the prior art, the first time a client makes an electronic request for information from the server, the server delivers the requested information and, in addition, an electronic "token" or Cookie that allows the "server" to recognize the "client" and is able to customize the information provided in subsequent requests. The Cookie can also be used to identify a specific client or set of clients to control access to specific information or entry points of the server's private network.

In ordinary commerce, information providers such as newspapers and magazines are used to attract or identify specific market segments of consumers in order to permit vendors to target consumers in those specific market segments with advertising. This frequently includes the use of coupons which may be redeemed by consumers for discounts on product purchases and for other benefits. Typically, the source of the coupon is either the vendor's own product or publication or that of a distributor or other information provider associated with the vendor. One of the benefits of coupons is that they provide the vendor with some measure of the effectiveness of their advertising by using coupons that are unique to each source of advertising. However, the tracking of paper coupons is a very time consuming and imprecise process.

With the advance of the Internet, consumers can download and print out coupons from many online sources. Consumers can take these coupons to their local store to redeem them or return them to their source along with a proof of purchase in order to receive a refund by mail. These methods are both inconvenient and time consuming for the consumer. Currently, there is no effective way to distribute and redeem coupons online.

Accordingly, it is an object of this invention to provide an improved method and system for distributing and redeeming coupons in a network environment.

SUMMARY OF THE INVENTION

The invention is directed to a method of and system for distributing and redeeming electronic coupons in a networked environment where the source of the coupons, the consumer and vendor are all connected to a common communications channel. The consumer, via a client system, can connect to a source of the coupons, typically a server, which will transfer an electronic coupon or a "book" of electronic coupons to the client. These coupons are transferred in advance of the client establishing a connection with the vendor's server in order to request information or obtain discounts on purchases of the vendors products or services. When the client does establish a connection with a vendor's server and initiates a transaction for information, goods or services, the vendor's server can recognize that the client bears a coupon which can modify the transaction and permit the client to redeem the coupon. The coupon can include an encrypted or encoded portion which would permit the server to communicate with another server such as an authentication server to authenticate and/or validate the coupon.

The system according to the invention includes a first server system, including a computer processor and associated memory and a client system, including a computer processor and associated memory, coupled to a communications channel. The client system is adapted to request information from the first server system and the first server system is adapted for transferring information over the communications channel. The first server system is also adapted for transferring an electronic coupon to client system and the client system is adapted for storing the electronic coupon in the associated memory. The system can further include a second server system, including a computer processor and associated memory, coupled to the communications channel. The client can be adapted to initiate a transaction with the second server system. The second server system can be adapted to detect the electronic coupon in order to enable or modify the nature or value of the transaction. The system can further include a third server system, including a computer processor and associated memory, which can be coupled to the communications channel. The second server system can establish a connection with the third server system in order to enable the third server system to authenticate the electronic coupon and authorize the completion of the transaction contemplated.

The method according to the invention includes the steps of a client system requesting information from a first server system. The first server system transfers the requested information and includes an electronic coupon along with the information transferred. The client system stores the electronic coupon in memory. The client system subsequently requests information from a subsequent server system. The subsequent server system can detect that the client system holds the electronic coupon and upon initiation of a transaction with the subsequent server system, the subsequent server system can enable or modify the transaction, such as by providing a discount in the purchase price of goods or services or provide access or a modified level of access to the information requested as a function of the electronic coupon.

DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a method of and system for distributing and redeeming electronic coupons. An electronic coupon is essentially a token, issued by or under the authority of the issuer for the benefit of recipient. Typically, the recipient receives the electronic coupon and subsequently redeems it for the prescribed benefit at some later point in time. Preferably, the electronic coupon enables or modifies an anticipated transaction such as providing a discount in the price of goods or services provided by the issuer or the issuer's agent. In addition, the electronic coupon can enable or modify the level of access to privately held information or a server having restricted access. Alternatively, the electronic coupon can be used in transactions between two businesses, two government agencies or two governments wherein, for example, the businesses enter into an agreement relating to a transaction for goods or services or access to information, or the governmental bodies enter into an agreement relating to transactions regarding currency or information.

Figure 1:
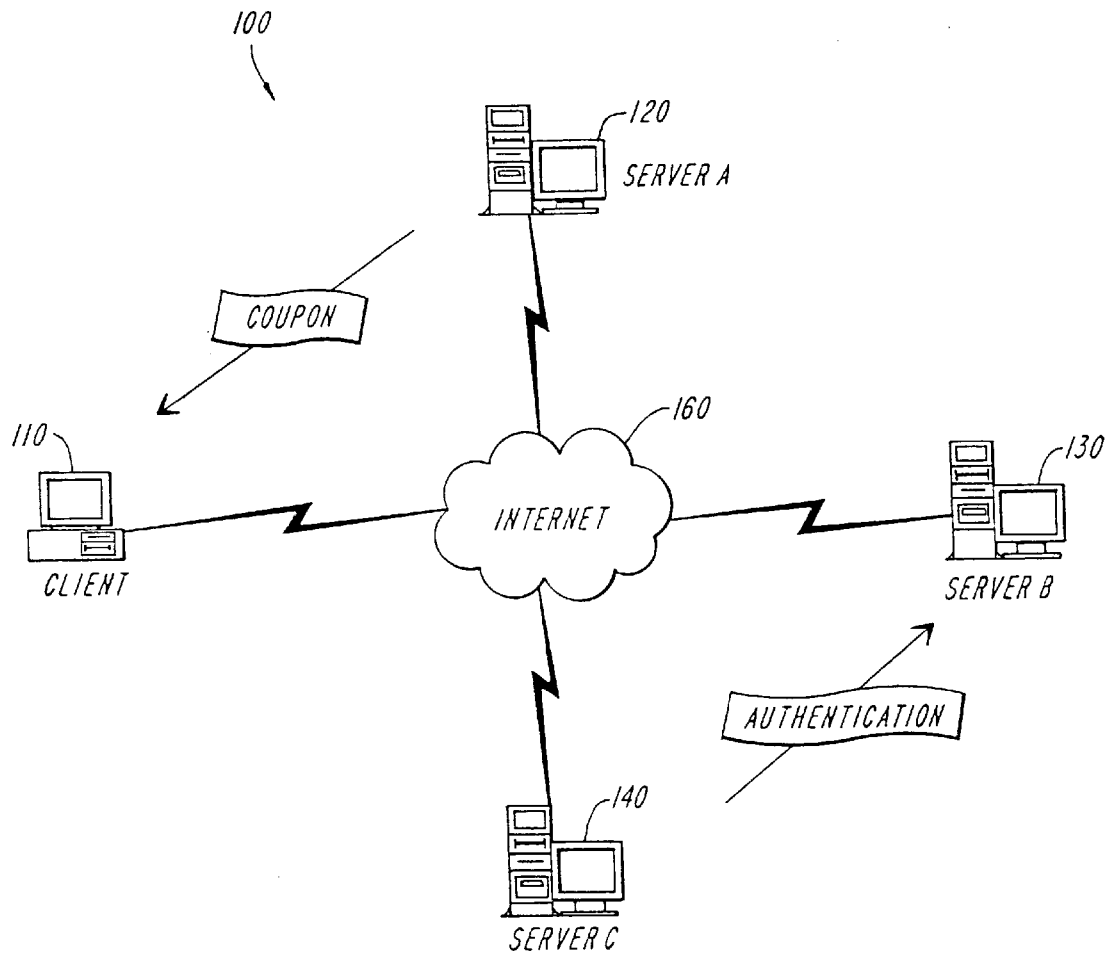
FIG. 1 is a diagrammatic view of a system for distributing and redeeming electronic coupons in accordance with the present invention.

FIG. 1 shows a diagram of a system 100 for distributing and redeeming electronic coupons in accordance with a preferred embodiment of the present invention. The system 100 includes Client system 110, Server System A 120, Server System B 130, and Server System C 140, all connected to a common communications channel 160. Preferably, the Client system 110, Server System A 120, Server System B 130, and Server System C 140 can be a personal computer such as an IBM PC or IBM PC compatible system or an APPLE MacINTOSH system or a more advanced computer system such as an Alpha based computer system available from the Digital Equipment Corporation division of Compaq Computer Corporation or SPARC Station computer system available from SUN Microsystems Corp, although a main frame computer system can also be used. Preferably, the communications channel 160 is a TCP/IP based network such as the Internet or an intranet, although almost any well known LAN, WAN, VPN technology can be used.

In one preferred embodiment of the invention, the Client system 110 is an IBM PC compatible operating the Microsoft Windows 95 or 98 operating system and Server System A 120, Server System B 130, and Server System C 140 are configured as Web Servers providing access to information such as web pages in HTML format via the HyperText Transport Protocol (http). Server System A 120 is also configured to generate cookies and to transfer the cookies to the Client System 110. The Client system 110 includes software to allow viewing of web pages, commonly referred to as a Web Browser, such as Communicator available from Netscape Communications Corp. or Internet Explorer available from Microsoft Corp. The Client system 110 is capable of accessing web pages located on Server System A 120 and Server System B 130. Server System C 140 is an authentication server which includes the software necessary to authenticate electronic coupons prior to their redemption.

In one preferred embodiment, Server System A 120 includes web server software that is adapted to produce an electronic coupon or a book of electronic coupons that is transferred to the Client system 110 in the form of a Cookie that is stored in memory at the Client system. Preferably, the electronic coupon is a data structure which can include any or all of the following information elements: data representative of an electronic coupon serial number or identification number, data representative of a unique key that can be used to validate or authenticate the coupon, data representative of the vendor that authorized the coupon and will redeem the coupon, data representative of the nature of the discount or access provided by the coupon, data representative of the server or entity that issued the coupon. In one preferred embodiment, the electronic coupon can be issued as part of an electronic coupon book. The coupon book can include data representative of a version number for the electronic coupon book and data representative of a serial number or identification number for the electronic coupon book.

In one preferred embodiment, the electronic coupon contains all the information necessary to redeem the coupon. Specifically, the electronic coupon identifies the grantor (i.e. the party or vendor that will redeem the electronic coupon), the nature of the discount or benefit provided and a unique serial number or other data structure that permits the electronic coupon to be authenticated or validated. Thus, a server redeeming this type of electronic coupon can obtain all the information necessary to redeem from the electronic coupon. The server can even include the software necessary to authenticate or validate the electronic coupon.

In an alternative embodiment, the electronic coupon book includes a unique serial number or identification number and a data structure useful for authenticating or validating the electronic coupon book. The actual content of the electronic coupon book can be determined, for example, by visiting a website which reads the coupon book serial number and provides the user with listing of the coupons available. The benefit to this configuration is the organization that issues the electronic coupon book can add vendors even after the electronic coupon book has been issued. Thus, if a vendor signs up with the organization that issues electronic coupon books after a particular coupon book has been issued to a client, the vendor can be added to the electronic coupon book at a later date. In order to redeem this type of electronic coupon, the server which intends to redeem the electronic coupon must connect to an authentication server which will authenticate or validate the coupon book and indicate the nature of the benefit of the electronic coupon to the server requesting authentication/validation.

Figure 2:
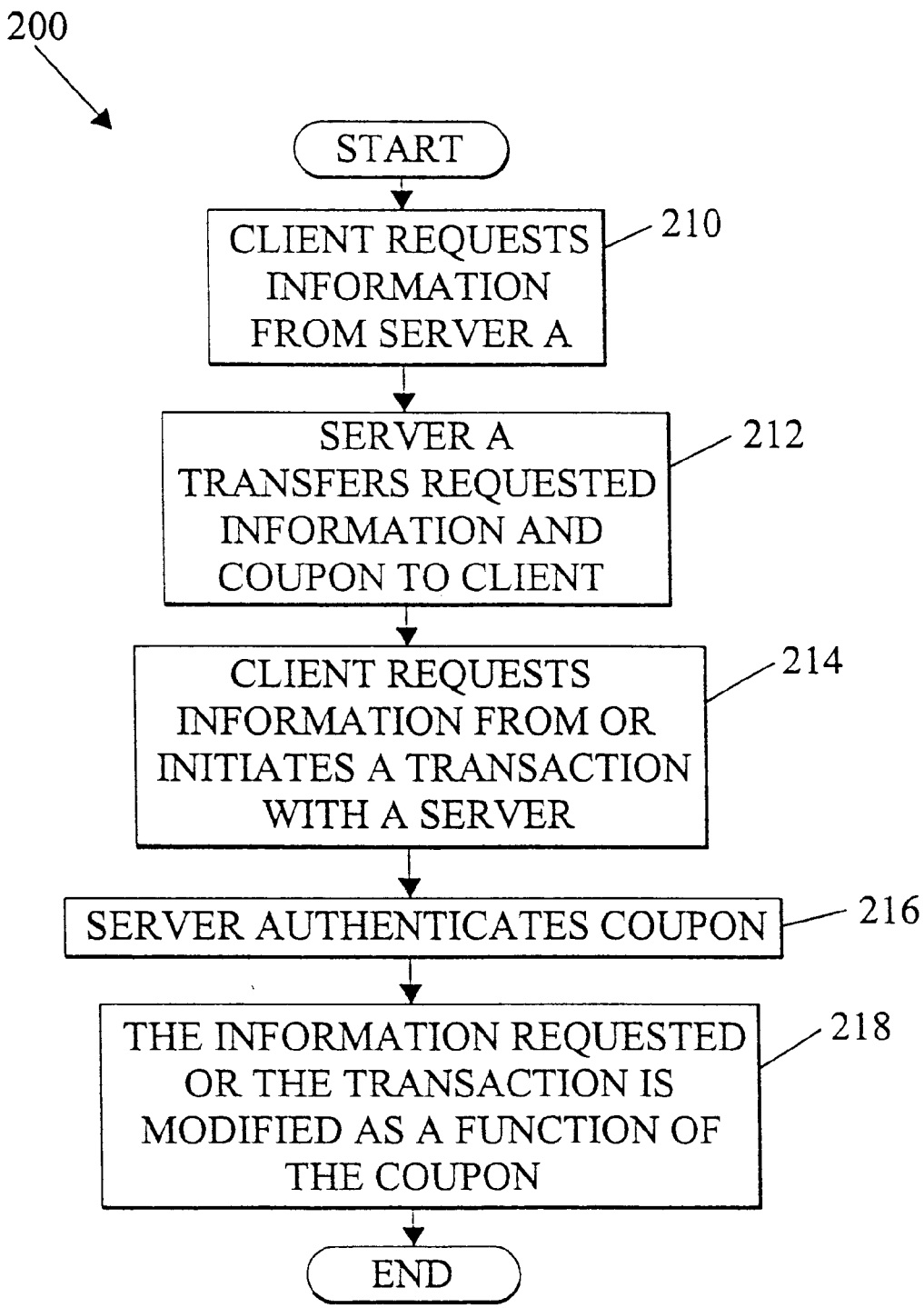
FIG. 2 is a flow diagram of a method of distributing and redeeming electronic coupons in accordance with the present invention.
Figure 3:
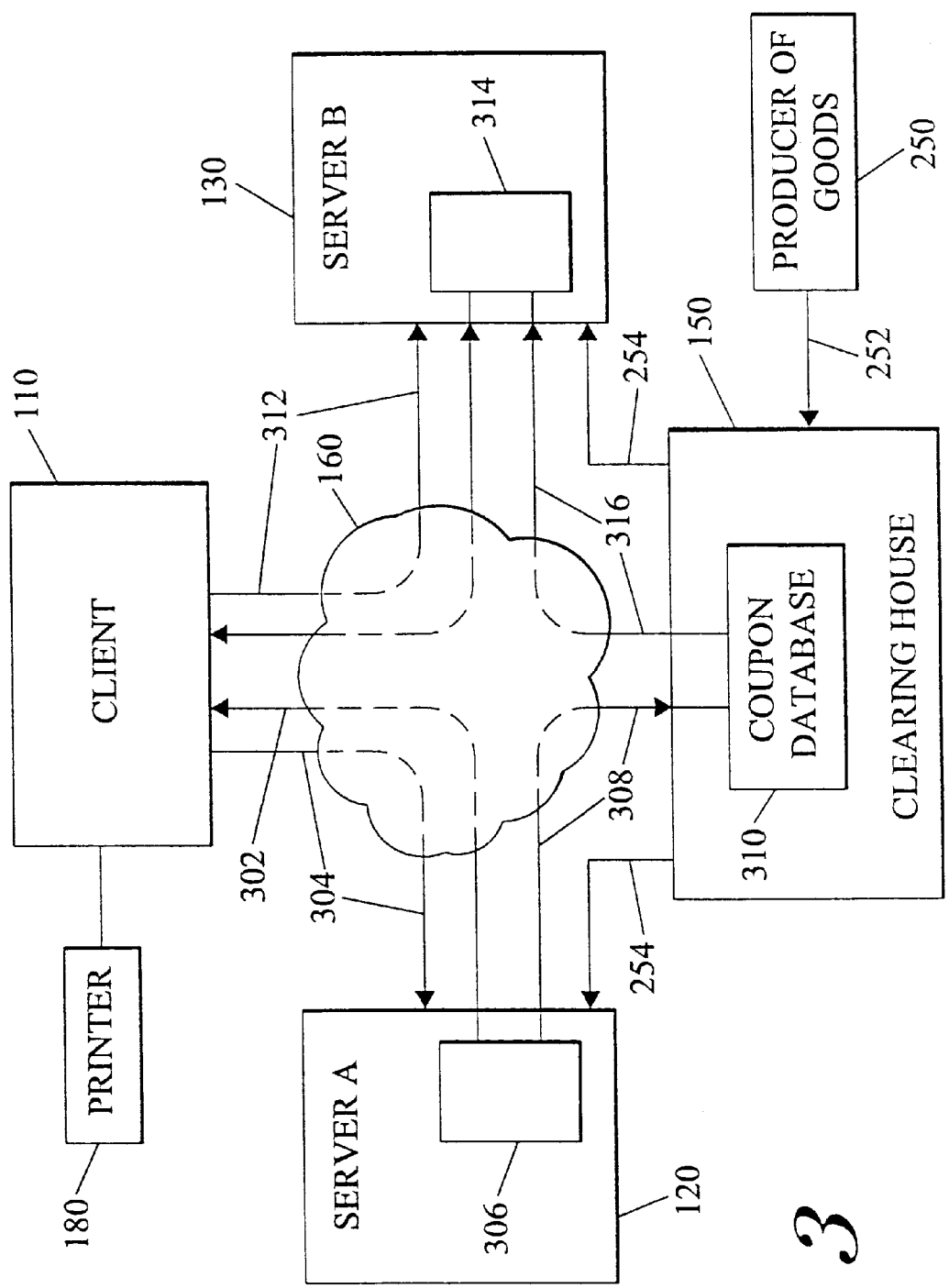
FIGS. 3, 4 and 5 are diagrammatic views of systems for distributing and redeeming electronic coupons from a coupon database.
Figure 4:
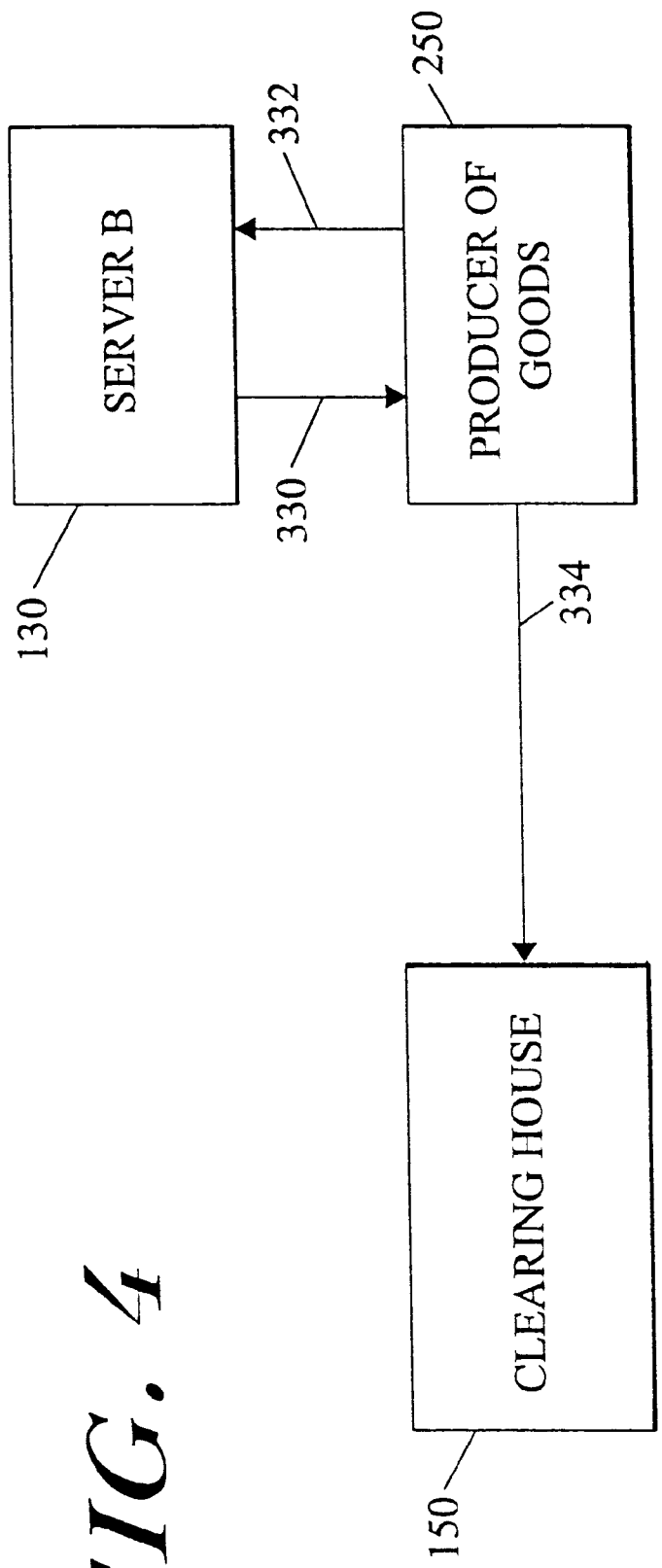
Figure 5:
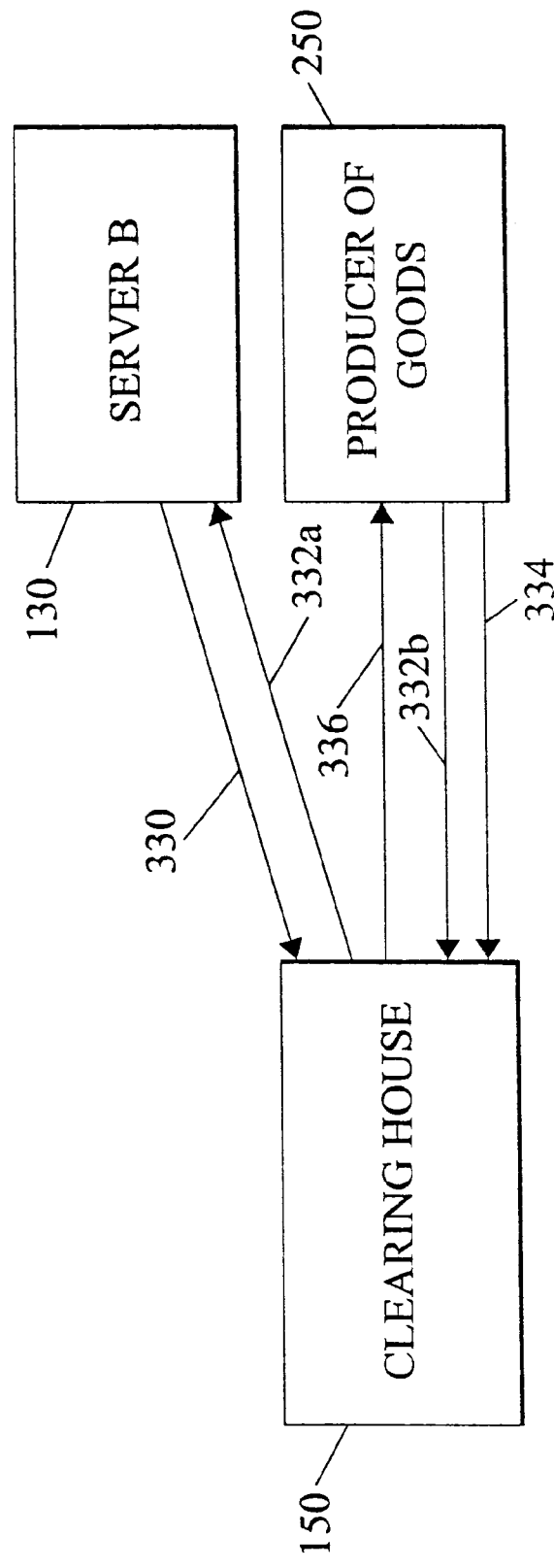

FIG. 2 shows a flow chart 200 of a method of distributing and redeeming coupons in accordance with one preferred embodiment of the invention. In a preliminary step 210, the client system requests information from Server A. In the next step 212, Server A transfers the requested information along with the electronic coupon to the Client system. The Client system stores the electronic coupon in memory. In the next step 214, the Client system initiates a transaction or requests information from a Server. The Server could be Server A or another server. At this point, depending upon the system, the Server could detect the presence of the electronic coupon on the Client system or the Client system could present the electronic coupon for redemption. In the next step 216, the Server authenticates the electronic coupon. Depending upon the system, the Server could evaluate the electronic coupon to authenticate or validate the electronic coupon, or alternatively, the Server could transfer the electronic coupon information to an Authentication Server which could authenticate or validate the electronic coupon and authorize the transaction. In the next step 218, the electronic coupon is used to modify or enable the transaction and the transaction is completed.

As one of ordinary skill will appreciate, it will not always be necessary for the Client system to request information from Server A. All that is necessary is for Server A to establish a connection with the Client system in order to transfer the electronic coupon to the Client system. One method of transferring the electronic coupon is to include the electronic coupon with the information requested. Alternatively, the electronic coupon can be transferred to the Client system by any method of transferring information.

In a preferred embodiment of the invention, the Client system is a personal computer running browser software which connects to web servers via the Internet or a similar network. Preferably, a book of electronic coupons is transferred to the Client system in the form of a Cookie which is stored in memory at the Client system. The Cookie can be detected by any subsequent web server that Client system connects to. If the Client system attempts to initiate a transaction with a particular web server, the web server detects the Cookie which includes electronic coupon and uses the electronic coupon to enable or modify the transaction. In this embodiment, when the Client system receives the electronic coupon, the user can be alerted to the presence of the electronic coupon by another browser window or a java based window that identifies all the electronic coupons in the electronic coupon book, the nature of the benefit provided and provides links to the various web sites where the electronic coupons can be redeemed. Alternatively, the Client system can connect to a web server which displays the contents of the electronic coupon book in the form of a web page which describes the nature of the electronic coupon benefit and a link to the web page where the electronic coupon can be redeemed.

As one having ordinary skill in the art will appreciate, the use of the client system will typically be operated or otherwise controlled by a consumer or a customer (in business to business transactions) and the server system or systems will be operated or otherwise controlled by an organization or an agent of an organization authorized to enter into and complete the transaction. In addition, as one having ordinary skill will appreciate the entire process and system can be automated, for example whereby a client system is programmed to periodically visit websites (whether or not known to the source of electronic coupons) or the originating server can be programmed to periodically distribute electronic coupons, such as by electronic mail, and the redeeming server can be programmed to automatically redeem the electronic coupon as part of an automated request to initiate a transaction received from an automated client system. One of ordinary skill in the art will also appreciate that the electronic coupons can include an expiration date or a window of dates when the electronic coupon is valid or effective.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for distributing and redeeming electronic coupons comprising:

a first server system including a computer processor and associated memory, said first server system being connected by a communications channel to a client system, said first server system being adapted for transmitting an electronic coupon to said client system over said communications channel;

said client system including a computer processor and associated memory, said client system being adapted for storing said electronic coupon in said memory;

a second server system connected to said communications channel, said second server system being adapted to establish a connection with said client system and for detecting said electronic coupon stored on said client system, said second server system further being adapted to redeem said electronic coupon.

2. A system according to claim 1 further comprising:

a third server system connected to said communications channel, said third server system being adapted for communicating with said second server system and for authorizing the redemption of said electronic coupon.

3. A system according to claim 1 wherein said second server system is adapted to redeem said coupon as a function of a transaction initiated between said client system and said second server system.

4. A system according to claim 1 wherein said second server system is adapted to redeem said coupon by modifying a transaction initiated between said client system and said second server system.

5. A system according to claim 1 wherein said communications channel includes a network.

6. A system according to claim 1 wherein said communications channel includes a TCP/IP based network and said coupon includes a cookie.

7. A system according to claim 1 wherein said first server system and said second server system are the same server system.

8. The system according to claim 1 wherein said electronic coupon is a token issued under the authority of an issuer for the benefit of said client.

9. The system according to claim 1 wherein said electronic coupon includes data representative of one or more of a serial or identification number, a validation key, an authentication key, an authorizing vendor, a redeeming vendor, a benefit or discount to be associated with a transaction, a level of access granted, and an issuing activity.

10. The system according to claim 1 wherein said electronic coupon includes data representative of the identity of a location at which additional coupon information resides.

11. A method of distributing and redeeming an electronic coupon comprising the steps of:

A) establishing a connection over a communications channel between a client and a server;

B) transferring said electronic coupon from said server to said client;

C) establishing a connection over a communications channel between said client and a subsequent server, said subsequent server including one of said server and other servers;

D) said client requesting information from said subsequent server;

E) said subsequent server recognizing said electronic coupon;

F) said subsequent server redeeming said electronic coupon as a function of a transaction initiated between said client and said subsequent server.

12. A method of distributing and redeeming an electronic coupon according to claim 11 wherein prior to step A, the server receives a request for information from the client.

13. A method of distributing and redeeming an electronic coupon according to claim 11 further comprising the step of:

authenticating said electronic coupon and authorizing a transaction between said client and subsequent server as a function of an authenticated electronic coupon.

14. A method of distributing and redeeming an electronic coupon according to claim 11 further comprising the steps of:

establishing a connection between said subsequent server and an authentication server;

said authentication server authenticating said electronic coupon and authorizing the redemption of said electronic coupon.

* * * * *